US007627784B1

(12) United States Patent
Allen et al.

(10) Patent No.: US 7,627,784 B1
(45) Date of Patent: Dec. 1, 2009

(54) MODULAR PROCESSOR DEBUG CORE CONNECTION FOR PROGRAMMABLE CHIP SYSTEMS

(75) Inventors: Timothy P. Allen, Santa Cruz, CA (US); Sean R. Atsatt, Santa Cruz, CA (US); James Loran Ball, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 392 days.

(21) Appl. No.: 11/101,027

(22) Filed: Apr. 6, 2005

(51) Int. Cl.
*G06F 11/00* (2006.01)
(52) U.S. Cl. .......................................... 714/30; 714/31
(58) Field of Classification Search ................... 714/30, 714/31; 710/110, 100
See application file for complete search history.

(56) References Cited

U.S. PATENT DOCUMENTS

| | | | | |
|---|---|---|---|---|
| 6,026,503 A * | 2/2000 | Gutgold et al. | | 714/45 |
| 6,189,061 B1 * | 2/2001 | Katz et al. | | 710/110 |
| 6,223,315 B1 * | 4/2001 | Whetsel | | 714/727 |
| 6,460,148 B2 * | 10/2002 | Veenstra et al. | | 714/39 |
| 6,567,932 B2 * | 5/2003 | Edwards et al. | | 714/30 |
| 6,587,995 B1 * | 7/2003 | Duboc et al. | | 716/4 |
| 6,598,177 B1 * | 7/2003 | Jones et al. | | 714/30 |
| 6,601,189 B1 * | 7/2003 | Edwards et al. | | 714/30 |
| 6,611,724 B1 * | 8/2003 | Buda et al. | | 700/49 |
| 6,615,370 B1 * | 9/2003 | Edwards et al. | | 714/45 |
| 6,769,076 B1 * | 7/2004 | Moyer et al. | | 714/30 |
| 6,820,051 B1 * | 11/2004 | Swoboda | | 703/28 |
| 6,859,891 B2 * | 2/2005 | Edwards et al. | | 714/30 |
| 6,948,098 B2 * | 9/2005 | Pillay et al. | | 714/34 |
| 6,963,963 B2 * | 11/2005 | Moyer | | 711/202 |
| 7,024,660 B2 * | 4/2006 | Andrade et al. | | 717/124 |
| 7,073,109 B2 * | 7/2006 | Kolman | | 714/724 |
| 7,080,283 B1 * | 7/2006 | Songer et al. | | 714/30 |
| 7,080,289 B2 * | 7/2006 | Swaine et al. | | 714/45 |
| 7,200,776 B2 * | 4/2007 | Harris | | 714/45 |
| 7,260,745 B1 * | 8/2007 | Edwards et al. | | 714/37 |
| 7,272,678 B2 * | 9/2007 | Davis | | 710/100 |
| 7,340,693 B2 * | 3/2008 | Martin et al. | | 716/1 |
| 2001/0010083 A1 * | 7/2001 | Satoh | | 714/30 |
| 2001/0032305 A1 * | 10/2001 | Barry | | 712/34 |
| 2003/0191624 A1 * | 10/2003 | Morigaki et al. | | 703/28 |
| 2004/0073841 A1 * | 4/2004 | Toros et al. | | 714/30 |
| 2004/0163013 A1 * | 8/2004 | Watt et al. | | 714/30 |
| 2004/0199824 A1 * | 10/2004 | Harter | | 714/30 |
| 2004/0250164 A1 * | 12/2004 | Ahmad et al. | | 714/30 |
| 2005/0102574 A1 * | 5/2005 | Larson et al. | | 714/30 |
| 2006/0075298 A1 * | 4/2006 | Drori et al. | | 714/30 |
| 2006/0190905 A1 * | 8/2006 | Martin et al. | | 716/18 |

OTHER PUBLICATIONS

Embedded Trace Macrocell, printout from ARM website (www.arm.com), printed on Nov. 22, 2005, 4 pages.

* cited by examiner

*Primary Examiner*—Joshua A Lohn
(74) *Attorney, Agent, or Firm*—Weaver Austin Villeneuve & Sampson LLP

(57) ABSTRACT

Methods and apparatus are provided for implementing a semiconductor device with a debug core separate from a processor core. The user configurable debug core can be customized to include one or more debug core submodules. Each debug core submodule is generally associated with a particular debug feature such as trace generation, performance counters, or hardware triggers. The debug core can be driven through a variety of interfaces to allow debugging, monitoring, and control of processor operations.

25 Claims, 8 Drawing Sheets

MODULAR PROCESSOR DEBUG CORE CONNECTION FOR PROGRAMMABLE CHIP SYSTEMS

BACKGROUND OF THE INVENTION

1. Field of the Invention

The present invention relates to semiconductor devices. More specifically, the present invention relates to methods and apparatus for implementing a semiconductor device with a debug core separate from a processor core.

2. Description of Related Art

A processor can perform a variety of processing activities, such as executing particular operations associated with a program. In order to determine the validity and efficiency of processor operations, debug mechanisms are often used to analyze and evaluate processor operations.

However, techniques and mechanisms for efficiently implementing various debug mechanisms associated with a processor are limited. In one example, debug mechanisms are integrated with the processor at design time by the processor vendor in a fixed manner. As such, the ability to change the debug mechanisms is substantially limited. Few third-party created debug mechanisms can be incorporated. In general, there is no way for a user to "mix and match" debug features in a deployed system.

It is therefore desirable to provide improved methods and apparatus for optimizing implementation of debug mechanisms, thereby enhancing the ease and flexibility of incorporating a variety of debug features as needed.

SUMMARY OF THE INVENTION

Methods and apparatus are provided for implementing a semiconductor device with a debug core separate from a processor core. The user configurable debug core can be customized to include one or more debug core submodules. Each debug core submodule is generally associated with a particular debug feature such as trace generation, performance counters, or hardware triggers. The debug core can be driven through a variety of interfaces to allow debugging, monitoring, and control of processor operations.

In one aspect, a method for implementing a device is provided. A processor core for implementation on the device is provided. A debug core associated with the processor core is selected. The debug core is operable to allow control and monitoring of the processor core. The debug core and a debug port associated with the processor core are connected. The debug core and the processor core are implemented on the device. In general, the debug core may include multiple debug core submodules. Therefore, the ease of integrating debug features with the processor core on the device can be realized.

In another aspect, a programmable chip is provided. The programmable chip includes a processor core and a debug core. The processor core includes a debug interface. The debug core includes multiple debug core submodules. The debug core is coupled to the processor core and operable to control and monitor the processor core through the debug interface. The debug core is associated with a debug core interface that allows access to the debug core submodules. As such, debug features can be flexibly integrated into the programmable chip as needed.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Figure 1A:
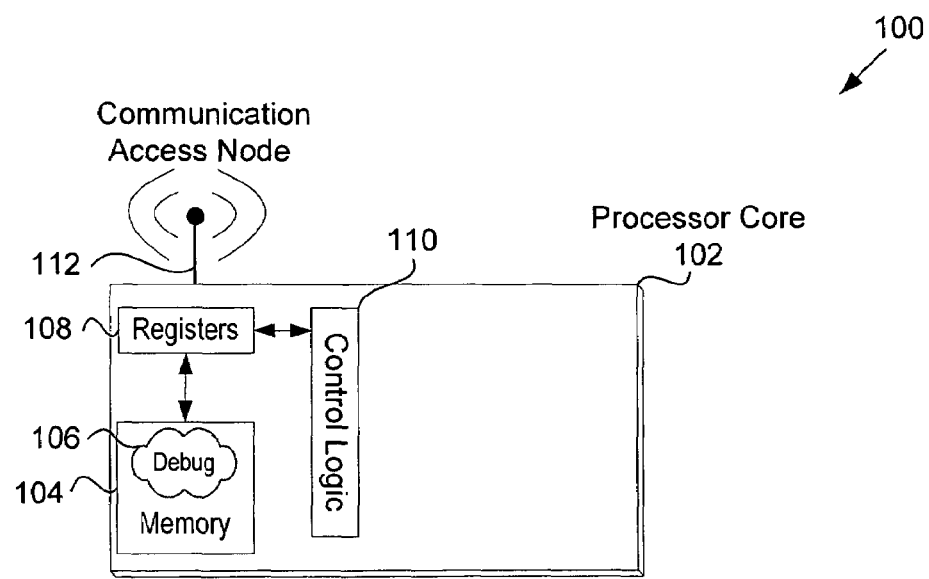
FIG. 1A is a diagrammatic representation showing one example of a system on a device having a debug mechanism integrated in a fixed manner.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processors and devices.

In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Methods and apparatus are provided for debugging a processor core. Any logic or mechanism used to debug, monitor, and/or control processor operation is referred to herein as a debug core. In one example, a debug core is associated with a processor core on a programmable chip system. Modularizing the debug core allows efficient implementation of various debug features for use with the processor core. In some cases, a modular debug core may include multiple debug core submodules for performing various debug features. In general, both the debug core and the processor core can be part of a system implemented on a device.

According to various embodiments, the processor core (i.e., CPU) and the debug core are handled as separate components (e.g., modules) by using a design tool such as SOPC Builder available from Altera Corporation of San Jose, Calif. Using the design tool, a user can choose various combinations of processor and debug features for implementation in a system. In addition, the user can import new debug features (e.g., via modular debug cores or debug core submodules) as needed (e.g., from third-party vendors). The design tool is typically operable to handle the connections between the debug core, the processor core, and any other component of the system with which the debug core communicates (e.g., an external host).

Systems where the debug logic is fixedly integrated with the CPU logic typically have a fixed set of debug functionalities, thereby limiting the ability to customize the processing system. However, the techniques and mechanisms of the present invention improve the ability to customize a processing system via modular debug logic plug-ins (e.g., modular debug core; debug core submodule). Modular debug logic plug-ins allow user configurable debug logic to be added to a CPU so that, for example, third parties could provide enhanced debug logic (e.g., as intellectual property or IP blocks) which could be added to the CPU "in the field" as required by a particular user application. The debug core can be driven using a variety of interfaces such as a JTAG interface.

FIG. 1A is a diagrammatic representation showing one example of a system 100 on a device having a debug mechanism 106 integrated in a fixed manner. The device can either be an application-specific integrated chip (ASIC), a field programmable gate array (FPGA), an application-specific standard product (ASSP), or another suitable semiconductor device. As shown, system 100 includes a processor core 102 having a variety of integrated components. These components may include memory 104, registers 108, control logic 110, and communication access node 112 (e.g., a Joint Test Action Group (JTAG) interface/node). Each component is generally interconnected in such a manner that debug mechanism 106 can debug processor core 102.

For instance, debug mechanism 106 may be integrated in memory 104 so that it can be accessed by control logic 110 to debug processor core 102. The results from debugging processor core 102 may be stored in registers 108, which can be accessed by a user via communication access node 112. In any case, debug mechanism 106 is fixed so that changes to debug mechanism 106 are limited. As such, the debug features are limited to whatever is initially provided by debug mechanism 106. In one example, the debug mechanism 106 may provide only a limited set of hardware triggers, preventing a user from customizing a set of hardware triggers to meet particular needs. In another example, the debug mechanism 106 may be able to measure processor performance but may not be able to measure processor performance to a fine enough degree of precision.

Figure 1B:
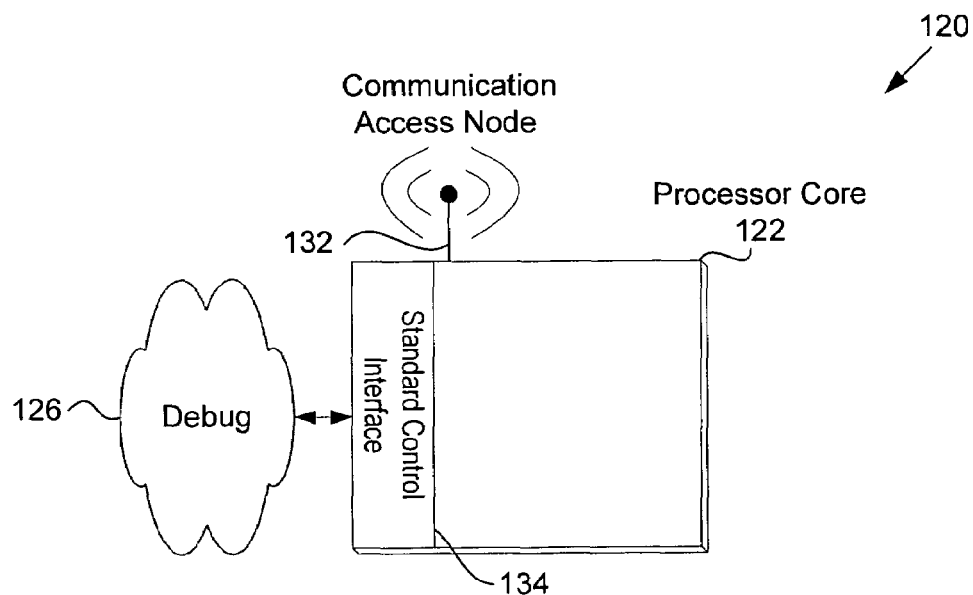
FIG. 1B is a diagrammatic representation showing one example of a system on a device that can use the techniques and mechanisms of the present invention.

FIG. 1B is a diagrammatic representation showing one example of a system 120 on a device that can use the techniques and mechanisms of the present invention. As shown, system 120 includes a processor core 122. Processor core 122 includes a standard control interface 134, which may be used to connect to debug mechanism 126. Standard control interface 134 is operable to receive any suitable number of debug mechanisms 126. Since debug mechanism 126 is a separate component (e.g., modular debug core; debug core submodule), which is not fixedly integrated with processor core 122, debug mechanism 126 may be interchanged with another debug mechanism 126 or modified with a set of debug features as needed (e.g., "in the field"). A communication access node 132 is provided in system 120 to allow access to at least a portion of debug mechanism 126 and processor core 122.

Figure 2:
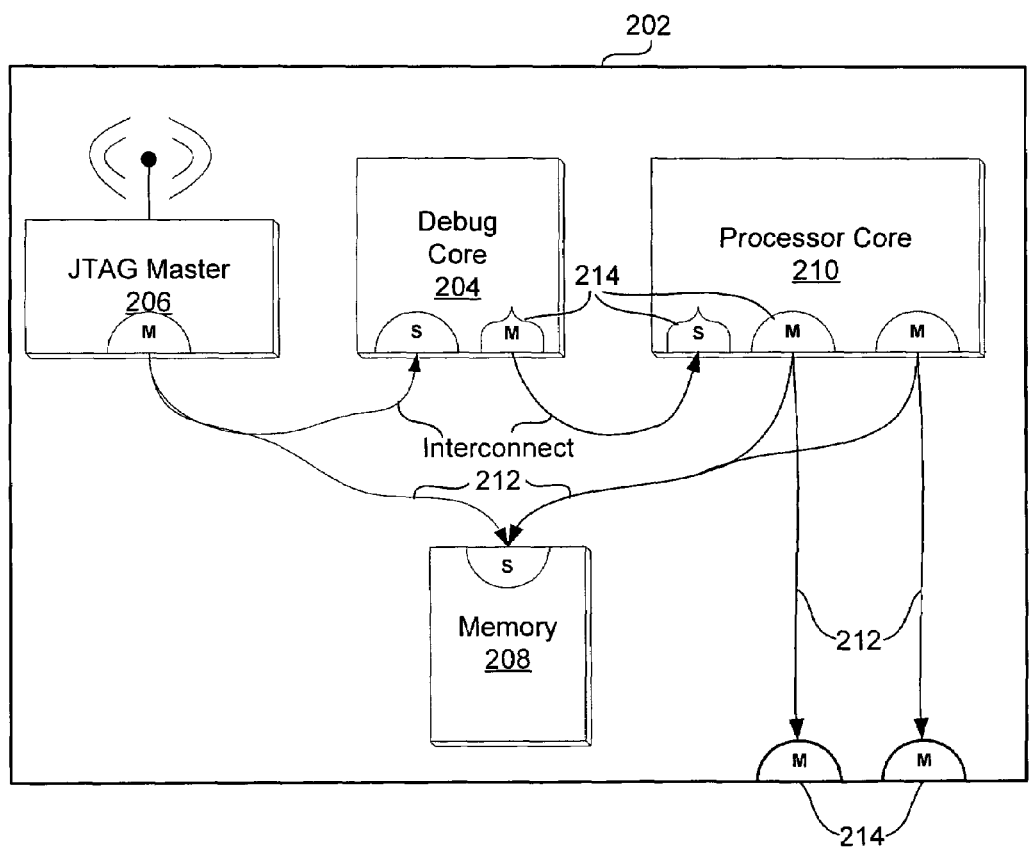
FIG. 2 is a diagrammatic representation of a system with a modular debug core on a device according to various embodiments of the present invention.

FIG. 2 is a diagrammatic representation of a debug system with a modular debug core 204 on a device 202 according to various embodiments of the present invention. In addition to debug core 204, the debug system may include any suitable number of components, such as a JTAG master 206 and a memory 208, to debug a processor core 210 (e.g., Nios II CPU available from Altera Corporation of San Jose, Calif.). Each component, including processor core 210, can be handled separately in configuring the debug system. Each component is generally selectable and customizable/parameterizable by the user. Further, the component may be readily available as an IP block from a library of components.

The debug system can allow users to control and observe processor core execution of instructions. The debug system may include both software and hardware components. According to a specific embodiment, the software components include a debug monitor. The debug monitor provides the ability to read and write memory, read and write CPU registers, and control the operation of debug core 204. The hardware component may include JTAG master 206 and debug core 204. The software components may run on a host computer.

In general, the software components of the debug system can be implemented together with a design tool. The design tool may be used to facilitate implementation of a system, including the debug system, on a device. For instance, interconnects 212 for connecting the various system components can be automatically or manually performed with the use of the design tool. Typically, the components can be interconnected via corresponding interfaces/ports 214. Some interfaces/ports correspond to master interfaces/ports whereas other interfaces/ports correspond to slave interfaces/ports. There can also be interfaces/ports available for interconnecting to other components of another device. The type of interfaces/ports (e.g., Avalon interface available from Altera Corporation of San Jose, Calif.) used may depend on the application. The debug system can allow the user to download applications, manage breakpoints, single-step code, display variable values, and perform other debug functions. The debug system can also provide build management and/or project management.

JTAG master 206 can connect to a JTAG hub in the ASIC or FPGA and can have an Avalon master interface. JTAG master 206 provides JTAG access to the registers in debug core 204. On the other hand, debug core 204 is operable to debug (e.g., break/interrupt) processor core 210 under various conditions and to record, compress, and/or store execution traces. Generally, debug core 204 can provide any suitable debug feature for the application. Some example features are the ability to break the CPU; single-step the CPU; reset the CPU and/or the entire SOPC Builder system; provide JTAG access to debug core registers; provide JTAG access to debug RAM; provide instruction triggers; provide data triggers; provide external triggers; provide multi-level triggers; provide instruction and data trace; facilitate on-chip or off-chip trace storage; and provide performance counters.

Figure 3:
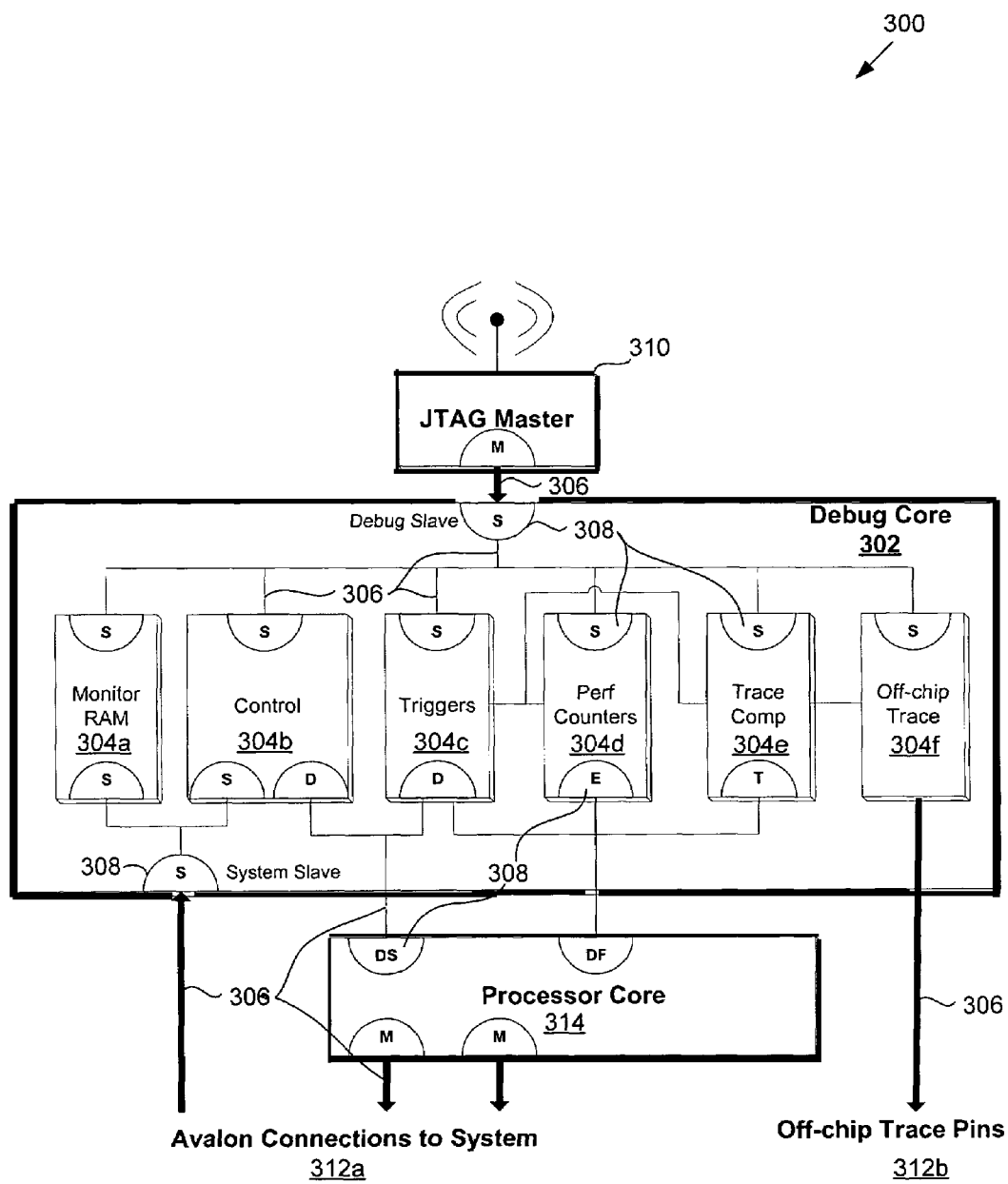
FIG. 3 is a diagrammatic representation of a system with a modular debug core having multiple debug core submodules in a device according to various embodiments of the present invention.

FIG. 3 is a diagrammatic representation of a system 300 with a modular debug core 302 having multiple debug core submodules 304 (i.e., 304a-f) in a device according to various embodiments of the present invention. Debug core 302 can be coupled to a JTAG master 310, a processor core 314, and any other associated system component 312 (e.g., 312a, 312b). Interconnects 306 may be used to interconnect (e.g., via corresponding interfaces/ports 308) debug core 302, debug core submodules 304, JTAG master 310, processor core 314, and any other associated system component 312. Interconnecting the components may be done manually (e.g., via a user) or automatically (e.g., via a design tool). As shown, interfaces/ports 308 may include an Avalon master interface (M), an Avalon slave interface (S), a debug interface (D), a trace interface (T), and an event interface (E). Interfaces/ports 308 can be configured based on the functionality of the associated system component. For instance, a master interface can be configured for a master component (e.g., processor core 314) whereas a slave interface can be configured for a slave component (e.g., debug core 302).

According to a specific embodiment, debug core 302 has two Avalon slave interfaces 308: a debug slave and a system slave. The debug slave normally connects to JTAG master 310, but may connect to any component with an Avalon master interface. The system slave typically connects to the instruction and data masters of processor core 314 (e.g., Nios II CPU available from Altera Corporation of San Jose, Calif.). The debug and system slaves can be independent interfaces.

In general, debug core 302 include several debug core submodules 304 with one or more memory locations accessible to the debug slave or system slave interfaces. Each of these submodules 304 may have one or more Avalon slave interfaces used to access these memory locations. Debug core 302 is operable to combine these Avalon slave interfaces together to create the debug slave and the system slave interfaces.

Debug Core 302 may include any suitable number of debug core submodules 304. For example, debug core 302 may include a monitor RAM submodule 304a, a control submodule 304b, a trigger submodule 304c, a performance counter submodule 304d, a trace compression submodule 304e, and an off-chip trace submodule 304f. In general, any of the debug core submodules 304 may be included or omitted from debug core 302. That is, some debug core submodules 304 are optional. However, in some instances depending on the application, a debug core submodule (e.g., monitor RAM submodule 304a; control submodule 304b) can be configured to be always included in debug core 302. As such, debug core 302 can be changed to include or omit certain debug core submodules 304, thereby increasing the flexibility to adapt to a users preference or application. For example, certain debug core submodules 304 can be omitted entirely or replaced with a third-party version.

Any logic or mechanism associated with debug core 302 that stores debug instructions and/or data is referred to herein as a monitor RAM submodule. According to a specific embodiment, monitor RAM submodule 304a stores instructions and/or data for the debug monitor. Monitor RAM submodule 304a is generally present in a system. Monitor RAM submodule 304a can be a 256×32 true dual-port synchronous RAM. As shown in FIG. 3, one port is connected to the Avalon debug slave interface 308 and the other to the Avalon system slave interface 308. Both ports may be configured to have registered inputs and unregistered outputs. The system slave interface 308 may be used to write to monitor RAM submodule 304a upon any suitable condition, such as when an Avalon input signal called "debugaccess" is true. This signal can be driven by processor core 314 and is true while in debug mode.

Next, control submodule 304b is generally responsible for breaking, single-stepping, and/or resetting processor core 314. Any logic or mechanism associated with debug core 302 that can control processor core 314 is referred to herein as a control submodule. According to a specific embodiment, control submodule 304b includes logic that is present when debugging is to be performed. As shown, control submodule 304b may have one Avalon slave port connected to the debug slave interface 308 and another Avalon slave port connected to the system slave interface 308. Typically, all associated registers are accessible to the debug slave interface. Further, registers required by monitor RAM submodule 304b to communicate with the host are accessible to the system slave interface. In some cases, registers can only be written when the Avalon input signal called "debugaccess" is true.

Control submodule 304b can break/interrupt processor core 314 under many situations. For example, the breaking/interrupting can occur under a pause execution (asynchronous), an instruction trigger (synchronous), a data trigger (asynchronous due to skid), or an external signal (asynchronous) situation. When control submodule 304b breaks processor core 314, it may assert a break request signal (brk_req) and hold it until processor core 314 drives the break acknowledge signal (brk_ack) height for a certain duration (e.g., one cycle).

Processor core 314 may include a debug mode bit when the debug facility is present. It can be set to true when processor core 314 accepts a break and then set to false when processor core 314 successfully executes a BRET instruction. The value of this bit can be provided to control submodule 304b from processor core 314. It can also be used to determine when the debug monitor code is active.

When debug is present, processor core 314 can include an output signal to its data masters called "debugaccess". This signal can be set to true when processor core 314 is in debug mode and false otherwise. It can be used to enable write access to the debug monitor RAM 304a as well as any on-chip memory components that were configured as ROMs. The first use prevents accidental writes to the monitor RAM 304a when processor core 314 is not in debug mode. The second use allows downloads of new ROM contents during development.

Control submodule 304b may also include a debug IENABLE register analogous to a CPU IENABLE register. The debug IENABLE register output is generally provided to processor core 314. Processor core 314 logically ANDs the debug IENABLE register with its own CPU IENABLE register. The debug IENABLE register can be used by the debug system to control which interrupts are allowed during debug operations. In general, interrupts are disabled when single-stepping processor core 314. The size of the debug IENABLE register can be computed by processor core 314 and provided to control submodule 304b. Processor core 314 can also provide a 32-bit constant mask to force unused interrupt bits to zero, thereby reducing logic element usage.

Control submodule 304b may be operable to drive a single-step signal to processor core 314. Processor core 314 may observe the value of this signal when exiting debug mode. If the value is set, processor core 314 may enter debug mode again. If an interrupt is pending and not masked by the debug IENABLE register, the processor core can execute a first instruction of the exception handler.

In general, control submodule 304b includes one or more static configuration registers accessible to the Avalon debug port. These can be read-only registers that include information about what debug core facilities are present. The host can query these registers to determine the configuration of debug core 302. The contents of these registers can include items such as the number of instruction triggers, off-chip traces, performance monitors, etc., present.

Next, a trigger submodule 304c may be operable to implement the instruction, data, and/or external triggers. Any logic or mechanism associated with debug core 302 that can trigger an event/action responsive to a condition is referred to herein as a trigger submodule. Trigger submodule 304c may be connected to the processor core's debug and event ports. Triggers cause actions/events to occur when their conditions become true. Parameters associated with each trigger's action and condition configuration can be stored in debug slave accessible registers.

There are typically three kinds of triggers: instruction, data, and external. The condition for instruction triggers can be based on an instruction address. The condition for data triggers can be based on a data address and/or data value for load/store instructions. The condition for external triggers can be based on an external trigger input signal. Instruction and data trigger conditions are generally qualified with valid instructions so that any speculatively dispatched instruction is killed/eliminated before completion can be ignored. According to a specific embodiment, triggers are disabled while in debug mode. Further, triggers often operate independently of each other and cannot be combined.

Triggers can be configured with different levels. For instance, four trigger levels can be shared by all of the triggers. A trigger condition may be qualified with one of the four trigger levels. This allows for multi-level triggers so that triggers can be sequenced. A trigger action may cause the trigger level to increment. Typically, the host/user can have the ability to manually set the current trigger level.

Multiple instruction triggers can be supported. For instance, up to 16 instruction triggers can be supported. Each instruction trigger can perform an equality comparison with the CPU instruction address. Similarly, multiple data triggers can be supported. For instance, up to 16 data triggers can be supported. Each data trigger can perform a range comparison with the CPU data address, a masked comparison with the CPU data value, and/or is further qualified by load, store, or load/store.

The range comparison may include an inclusive range with the minimum and maximum values ranging from zero to the largest data address. The range comparison may degenerate to a single data address by setting the minimum and maximum to the desired data address. A masked data comparison may include a logical AND of the CPU data value with a 32-bit mask followed by an equality comparison with the desired data value. If a memory management unit (MMU) is present, virtual addresses can be used.

External triggers are also supported by the present invention. This can be an input signal to debug core 302. It can be pulsed high for one cycle to cause a trigger. The trigger can be held until the associated action is completed. If the external trigger is pulsed high before the action completes, it can be ignored.

When a trigger condition is satisfied, any suitable action depending on the application may occur. For example, one or more of the following actions may occur: break the CPU; pulse external trigger-out signal for one cycle; enable trace; disable trace; enable data trace; disable data trace; allow data trace for the associated load/store instruction (e.g., data triggers); trigger trace (e.g., pre-trigger, post-trigger); enable performance counters; disable performance counters; increment the trigger count performance counter; increment trigger level. If multiple triggers may cause conflicting actions (e.g. enable trace and disable trace), a priority scheme may be implemented. For example, the following priority scheme may be enforced (highest to lowest): external trigger, instruction trigger, data trigger. Within each type of trigger, the one with the lowest index is often given priority.

A trigger may include a skid, which can be defined as the maximum number of instructions between the instruction associated with the trigger condition and a trigger action taking effect. Skid is often caused by pipelined CPUs, which don't provide all values used for trigger conditions at the same time. Instruction triggers tend to fire earlier than data triggers because the instruction address is known at the beginning of the pipeline and the sources for the data triggers (data address, store data, and load data) are known later. In general, skid should be minimized (typically it should just be a few instructions in a worst-case scenario). In some cases, zero skid may be required. For example, an instruction trigger may have a zero skid requirement for all actions. For another example, a data trigger may have a zero skid requirement for all actions except breaking the CPU.

Next, performance counter submodule 304d generally counts CPU events. Any logic or mechanism associated with debug core 302 that measures the performance of processor core 314 is referred to herein as a performance counter submodule. According to a specific embodiment, two 40-bit performance counters may be present. Each counter may be configured by a programmable register to count the events. Triggers may be used to enable/disable performance monitors or the user may manually control them via a programmable control register. The events are typically a function of processor core 314. Table 1 lists some sample performance counter events.

TABLE 1

| Name | Cores | Description |
|---|---|---|
| Cycle | All | True every cycle performance counters enabled. |
| Instruction executed | All | Instruction was successfully retired. |
| Branch mispredicted | s/f | Conditional branch instruction mispredicted. |
| Branch correctly predicted | s/f | Conditional branch instruction correctly predicted. |
| I-cache miss | s/f | Executed instruction missed in I-cache. |
| D-cache load miss | f | Cacheable load instruction missed in D-cache. |
| D-cache load hit | f | Cacheable load instruction hit in D-cache. |
| D-cache store miss | F | Cacheable store instruction missed in D-cache. |
| D-cache store hit | F | Cacheable store instruction hit in D-cache. |
| Trigger<n> | All | Trigger <n> was true. |

Next, trace compression submodule 304e is generally configured to create a stream of compressed trace information. Any logic or mechanism associated with debug core 302 that traces processor core 314 is referred to herein as a trace compression submodule. According to a specific embodiment, trace compression submodule 304e is operable to compress the trace information from processor core 314 and store it in an on-chip FIFO. The FIFO can be either drained by the host via the debug interfaces or by dedicated pins if an off-chip trace submodule 304f is present.

The trace can be composed of instruction trace and data trace. Instruction trace generally records enough information for the host to reconstruct the program counter (instruction address) of all executed instructions. Data trace generally records the data address and data value of load/store instructions, the data address of flush instructions, and the data value for rdctl instructions. Compressing trace information often represents a trade-off between compressor complexity and compression rate. The compression scheme should take the characteristics of the target device (e.g., FPGA, ASIC, etc.) into account.

A trace may be composed of a series of frames. A frame is often composed of an array of packets. Packets are encoded so that the decompressor on the host can identify the packet type, contents, and length. Each frame may be decompressed by the host independently of the other frames. The compressed trace may also be encoded so that a new frame may be detected even if the host starts decompressing the trace in the middle of a frame. The host may search the trace for the first new frame and start decompressing the trace. The beginning of a trace frame may include the instruction address of the first instruction traced in that frame. It also may indicate if there is any gap in the trace between the new frame and the previous frame.

A host may have access to the instruction memory image associated with the trace (e.g., by having access to an application ELF file). This can reduce the amount of information that is recorded for an instruction trace since the host can examine the current instruction and use that to help determine the next program counter value. The host may also have access to the system description file. Instructions can be grouped into the following types, as shown in Table 2, based on how to determine the next PC:

TABLE 2

| Instruction Type | Information Recorded |
| --- | --- |
| Indirect Jump (JMP, CALLR, RET, ERET, BRET) | target PC |
| Conditional branch | taken/not-taken |
| Unconditional branch | None |
| Direct Jump (CALL) | None |
| Trap/Break/Unimplemented/Illegal Instructions | None |
| All others (e.g. arithmetic, memory, custom) | None |

Referring to Table 2, the taken/not-taken and trap/no-trap conditions can be mutually exclusive (e.g., where conditional branches are always implemented). As such, a boolean status can share the same bit and the host can differentiate its meaning based on the instruction type.

It should be noted that interrupts are generally recorded with an exception packet. The packet includes a mechanism for determining which instruction was interrupted (because some instructions may have no associated trace packet). This mechanism can be similar to an instruction offset into the frame or the PC of the interrupted instruction.

Support for data trace (data address and data value) can be optionally added (e.g., by the user). When present, data trace can be enabled or disabled by the user via a programmable control register. Data trace and instruction are generally mixed together in the same trace file. When the host decompresses the trace including both instruction and data trace, it is able to identify the instruction associated with the data trace information. Data trace may be enabled or disabled at any time while instruction trace stays active.

Trace compression submodule 304e may support multiple debug capture modes. According to a specific embodiment, two capture modes are supported: full-capture and partial-capture. In full-capture mode, trace compression submodule 304e may stall processor core 314 to prevent losing trace information (e.g., prevents FIFO overflows). In partial-capture mode and while data trace is active, trace compression submodule 304e may temporarily disable data trace if the FIFO reaches a particular buffer level, for example, 90% full.

If data trace is not enabled, trace compression submodule 304e may discard all new trace information until the FIFO reaches a particular buffer level, for example, 50% full. However, this may result in gaps in the instruction trace. When trace is started again, a new frame can be generated.

Any suitable trace compression rate may be implemented with the present invention. For instance, instruction trace only compression may achieve a maximum average bandwidth of 9 bits per instruction. Data trace compression may achieve a maximum average bandwidth of 18 bits per instruction. Further, any suitable trace position may be implemented. For instance, the user may specify the amount of trace acquired before the trigger event via a programmable register. Table 3 shows some sample trace trigger positions.

TABLE 3

| Name | Description |
| --- | --- |
| Pre-trigger | Saves $\frac{1}{8}^{th}$ of trace before the trigger and $\frac{7}{8}^{th}$ after the trigger |
| Post-trigger | Saves $\frac{7}{8}^{th}$ of trace before the trigger and $\frac{1}{8}^{th}$ after the trigger |
| manual-trigger | User manually enables/disables trace |

Next, off-chip trace submodule 304f is generally operable to send compressed trace to an external trace storage device (e.g., via off-chip trace pins 312b). Any logic or mechanism associated with debug core 302 that communicates with an external trace storage device is referred to herein as an off-chip trace submodule. Off-chip trace submodule 304f can accept compressed trace from trace compression submodule 304e and send it to an off-chip trace storage device via the trace port. According to a specific embodiment, the trace port includes one output pin for the trace clock, 18 output pins for trace data, and one optional output pin for trigger out. The trace clock may have any suitable range for the application (e.g., from 20 MHz to 133.33 MHz). The off-chip trace storage device may record the value of the trace data on every clock cycle. Off-chip trace submodule 304f may be operable to skip over any empty portion in the trace compression FIFO if present. In another specific embodiment, off-chip trace submodule 304f is compatible with the FS/2 trace capture pod and/or the Lauderbach trace capture pod, which are pods commonly known to persons skilled in the art.

Figure 4:
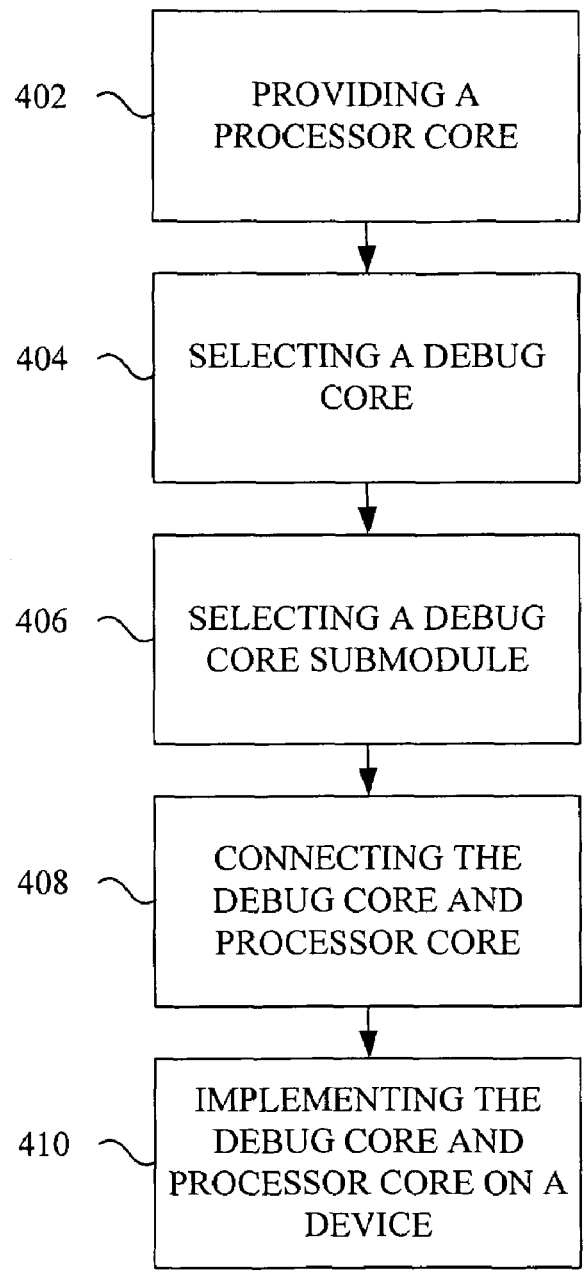
FIG. 4 is a process flow diagram showing the implementation of a device with a modular debug core and a processor core.

FIG. 4 is a process flow diagram showing the implementation of a device with a modular debug core and a processor core. At 402, a processor core is provided. At 404, a debug core is selected. In one example, the debug core is parameterizable by the user. At 406, a debug core submodule can also be selected. Here, any number of debug core submodules can be added or removed. At 408, the debug core and processor core are connected. In one example, the connections are made manually by a user. In another example, the connections can be made automatically according to a predetermined manner. At 410, the debug core and processor core are implemented on the device.

It should be noted that although FIG. 4 is used to describe one example of implementing a device with a modular debug core and a processor core, many other examples and configurations are possible. Furthermore, any part of the diagram can be modified or repeated to fit the particular application but are not described here for clarity. For example, the entire process flow diagram can be repeated for multiple debug cores and processor cores.

Although the techniques and mechanisms of the present invention or applicable to a variety of different processors including general purpose processors, video accelerators, cryptography accelerators, digital signal processors, microcontrollers, etc., the techniques and mechanisms of the present invention or particularly applicable to soft core processors on programmable chips and programmable chip systems.

Figure 5:
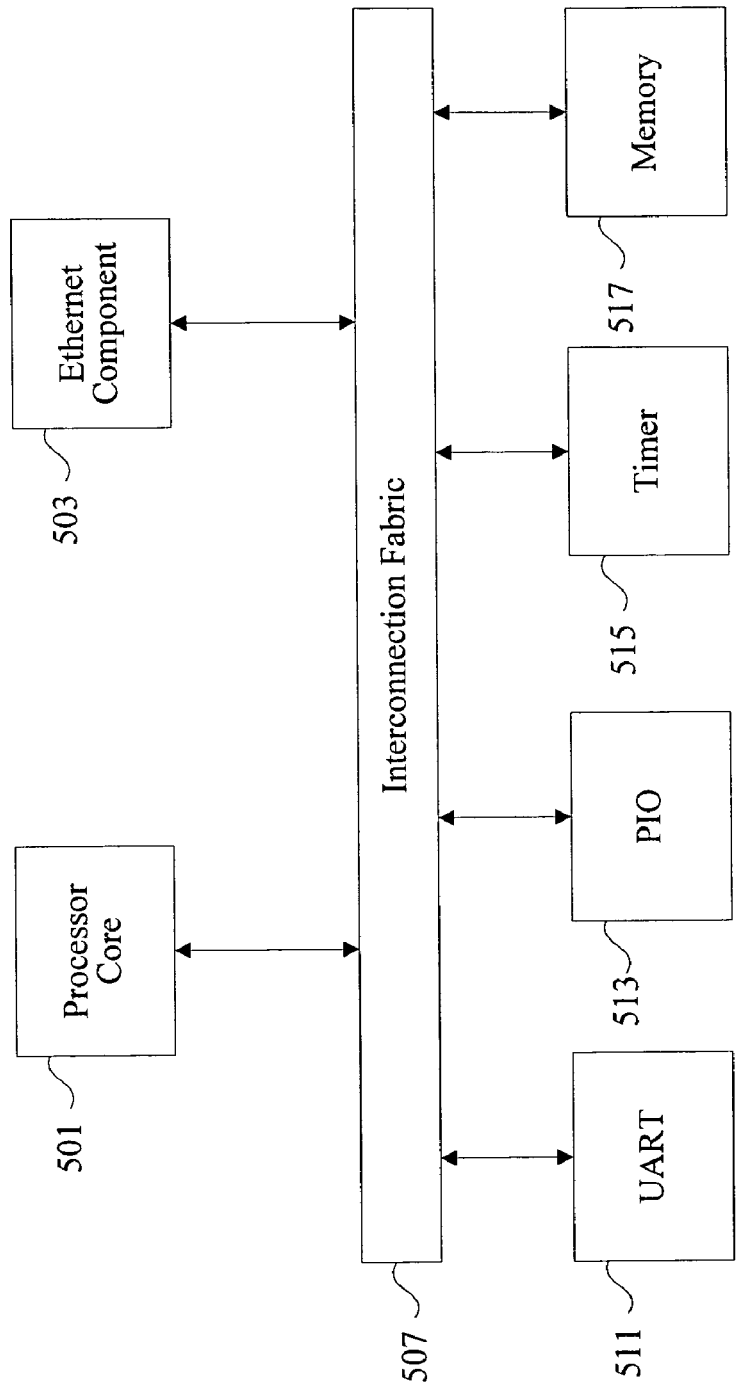
FIG. 5 is a diagrammatic representation showing one example of a system on a programmable chip that can be used to implement the techniques of the present invention.

FIG. 5 is a diagrammatic representation showing one example of a system on a programmable chip that can be used to implement the techniques of the present invention. The system includes peripheral devices and peripheral interfaces. Peripheral devices and peripheral interfaces are herein referred to as components. The system on a programmable chip includes a processor core 501 and an Ethernet component 503 as well as peripheral components UART 511, PIO 513, timer 515, and data memory 517. In some examples, the Ethernet component 503 is instead a debug core, a Digital Signal Processing (DSP) core, a cryptography accelerator, or a video processor. It should be noted that the system can include both on-chip memory 517 and off-chip memory. In one example, the data memory 517 can support variable latency or fixed latency access. The components are interconnected using an interconnection fabric 507. Any mechanism or logic for connecting components in a system is referred to herein as an interconnection fabric. In one example, the interconnection fabric is a bus. In another example, the interconnection fabric is a secondary side arbitration fabric.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

The techniques and mechanisms of the present invention allow the implementation of a system on a programmable chip from a high-level language program. In one example, variable latency and fixed latency can be supported on a system using a conventional bus architecture.

A system bus typically has a set width (e.g. 64 bits, 128 bits) and allows only one primary component to actively use the bus at any one time. In conventional systems, only one primary component can access any one of the given secondary components at any given time. Multiple primary components accessing secondary components in a manner that would cause data bit collisions if performed on the same data lines is referred to herein as accessing secondary components at the same time.

In one example, an Ethernet component is accessing a secondary PIO. While the Ethernet component is accessing the secondary PIO, a processor can not access an SDRAM through a peripheral interface even if both the primary streaming output device and the peripheral interface are available.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip or a programmable device. Instead of implementing complicated bus sharing schemes using mechanisms such as splitting, the bus itself can be eliminated to improve system performance.

According to specific embodiments, it is recognized that primary components and secondary components need not be routed through a construct such as a bus. By not routing signals through a bus, a streaming output device can be implemented in a much more efficient manner. The conventional data and address lines that make up the bus are no longer the resource in contention. Instead, secondary components are resources in contention, as the number of physical lines connected to each secondary component in a system can be fixed. Furthermore, by not using a bus, interconnection flexibility is enhanced. For example, an Ethernet component can be allocated a variety of ports for directly accessing a memory and the only resource in contention would be the memory.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator. In one embodiment, there is a secondary side arbitrator for each secondary component in a computer system. In other embodiments, there is a secondary side arbitrator for selected secondary components in a system. The techniques of the present invention recognize that Ethernet component support for high-level language programs can be more efficiently and effectively provided in a system by using secondary side arbitration.

Figure 6:
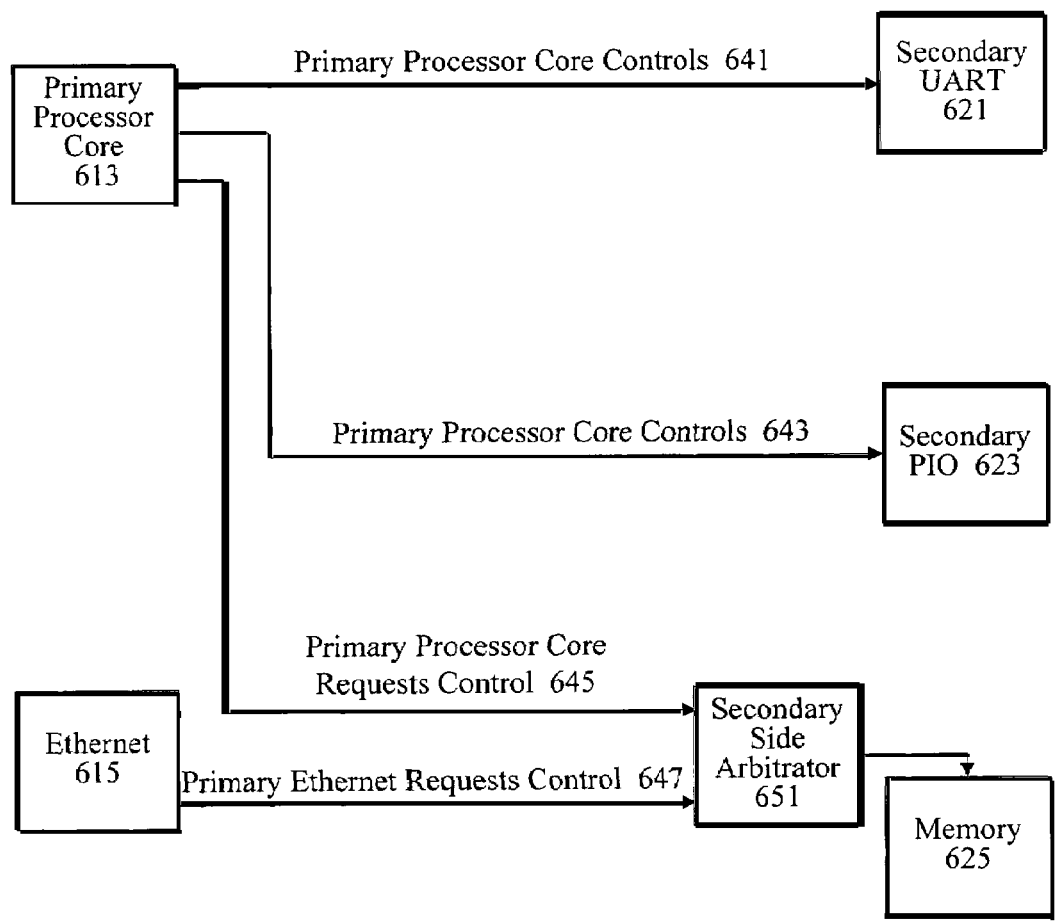
FIG. 6 is a diagrammatic representation showing one example of a system using secondary side arbitration.

FIG. 6 is a diagrammatic representation showing one example of a system using secondary side arbitration, sometimes referred to as slave side arbitration, simultaneous multiple primary components, or simultaneous multiple masters. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments, a secondary component such as peripheral interface 625 is associated with a secondary side arbitrator 651. However, secondary components UART 621 and PIO 623 are not associated with any arbitrator. In one example, secondary component UART 621 and secondary PIO 623 can only be accessed by primary CPU 613 and not by primary Ethernet device 615. A secondary memory component 625, however, can be accessed by both primary CPU 613 and primary Ethernet device 615.

According to various embodiments, a secondary side arbitrator 651 allows a first secondary component in a system to be accessed by a first primary component at the same time a second secondary component in the system is accessed by a second primary component. For example, peripheral interface 625 can be accessed by primary Ethernet 615 through secondary side arbitrator 651 at the same time, secondary UART 621 is accessed by primary CPU 613.

By allowing a CPU to access a secondary component at the same time another primary component such as a streaming output device or an Ethernet component is accessing memory, bus bottlenecks can be reduced. By using the simultaneous multiple primary component architecture, more direct connections between components can also be supported.

Figure 7:
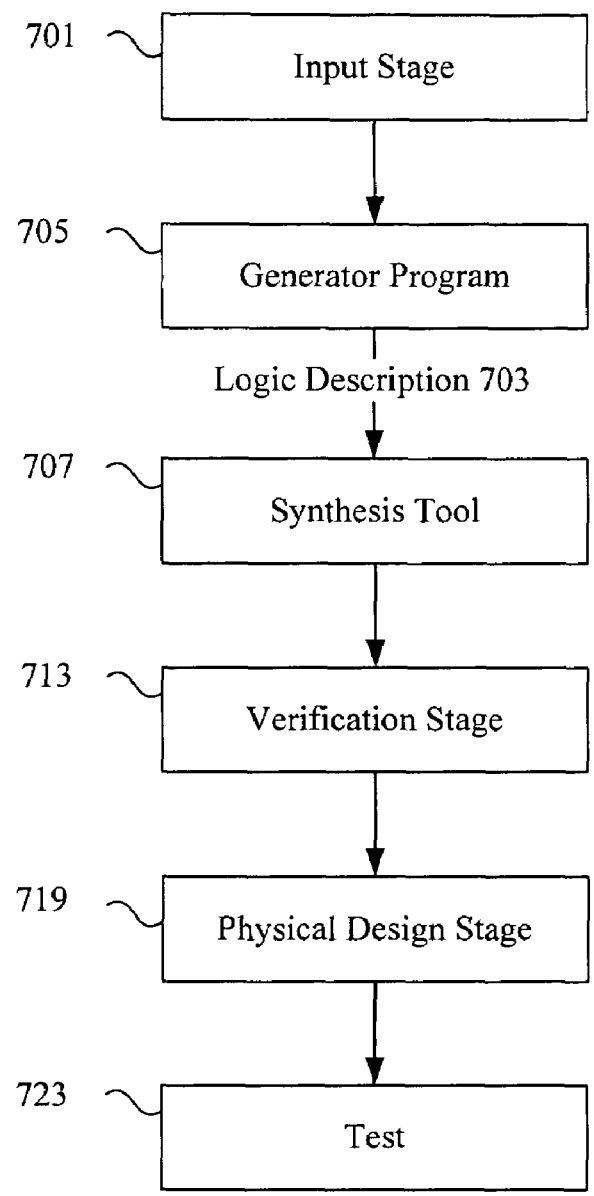
FIG. 7 is a diagrammatic representation showing implementation of a system on a programmable chip.

FIG. 7 is a diagrammatic representation showing implementation of a system on a programmable chip. An input stage 701 receives selection information typically from a user for logic such as a processor core as well as other components such as a modular debug core/debug core submodule to be implemented on an electronic device. In one example, the input received is in the form of a high-level language program. A generator program 705 creates a logic description and provides the logic description along with other customized logic to any of a variety of synthesis tools, place and route programs, and logic configuration tools to allow a logic description to be implemented on an electronic device.

In one example, an input stage 701 often allows selection and parameterization of components to be used on an electronic device. The input stage 701 also allows configuration of variable or fixed latency support. In some examples, components provided to an input stage include intellectual property functions, megafunctions, and intellectual property cores. The input stage 701 may be a graphical user interface using wizards for allowing efficient or convenient entry of information. The input stage may also be a text interface or a program reading a data file such as a spreadsheet, database table, or schematic to acquire selection information. The input stage 701 produces an output including information about the various modules selected.

In typical implementations, the generator program 705 can identify the selections and generate a logic description with information for implementing the various modules. The generator program 705 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 705 identifies pointers and provides ports for each pointer. One tool with generator program capabilities is System on a Programmable Chip (SOPC) Builder available from Altera Corporation of San Jose, Calif. The generator program 705 also provides information to a synthesis tool 707 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may include technology specific code readable only by a synthesis tool. The HDL files at this point may also be passed to a simulation tool.

As will be appreciated by one of skill in the art, the input stage 701, generator program 705, and synthesis tool 707 can be separate programs. The interface between the separate programs can be a database file, a log, or simply messages transmitted between the programs. For example, instead of writing a file to storage, the input stage 701 can send messages directly to the generator program 705 to allow the generator program to create a logic description 703. Similarly, the generator program can provide information directly to the synthesis tool instead of writing HDL files. Similarly, input stage 701, generator program 705, and synthesis tool 707 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 707.

A synthesis tool 707 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 713 typically follows the synthesis stage 707. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 713, the synthesized netlist file can be provided to physical design tools 719 including place and route and configuration tools. A place and route tool typically locates logic cells on specific logic elements of a target hardware device and connects wires between the inputs and outputs of the various logic elements in accordance with logic required to implement an electronic design. The device can also be physically tested at 723.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 701, the generator program 705, the synthesis tool 707, the verification tools 713, and physical design tools 719 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 8:
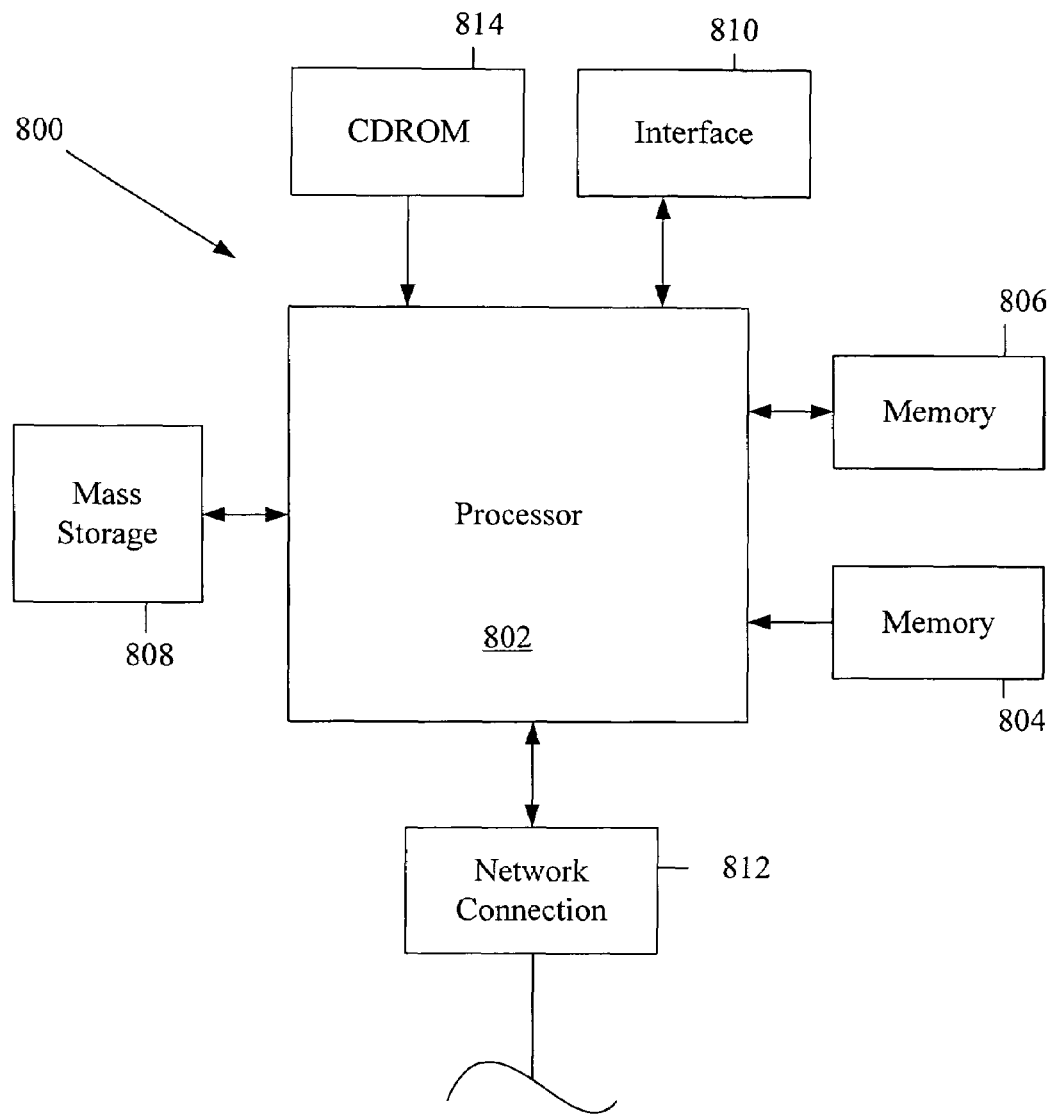
FIG. 8 illustrates a typical computer system that can be used to implement a programmable chip.

FIG. 8 illustrates a typical computer system that can be used to implement a programmable chip. The computer system 800 includes any number of processors 802 (also referred to as central processing units, or CPUs) that are coupled to devices including memory 806 (typically a random access memory, or "RAM"), memory 804 (typically a read only memory, or "ROM"). The processors 802 can be configured to generate a test sequences for any designated processor. As is well known in the art, memory 804 acts to transfer data and instructions uni-directionally to the CPU and memory 806 is used typically to transfer data and instructions in a bi-directional manner.

Both of these memory devices may include any suitable type of the computer-readable media described above. A mass storage device 808 is also coupled bi-directionally to CPU 802 and provides additional data storage capacity and may include any of the computer-readable media described above. The mass storage device 808 may be used to store programs, data and the like and is typically a secondary storage medium such as a hard disk that is slower than memory. The mass storage device 808 can be used to hold a library or database of prepackaged logic or intellectual property functions (e.g., modular debug core; debug core submodule), as well as information on generating particular configurations. It will be appreciated that the information retained within the mass storage device 808, may, in appropriate cases, be incorporated in standard fashion as part of memory 806 as virtual memory. A specific mass storage device such as a CD-ROM 814 may also pass data uni-directionally to the CPU.

CPU 802 is also coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. It should be noted that the system 800 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 808 or 814 and executed on CPU 802 in conjunction with primary memory 806.

One of the many advantages that the present invention provides is that the user (e.g., system designer) has access to, and control over, a potentially richer set of debug features. The user can also choose debug features instead of being limited to the set from the factory (e.g., processor vendor). Further, debugging the processor can be performed using different configurations. For instance, debugging the processor can be done via a communication access node (e.g., JTAG node) or any complementary component (e.g., Avalon master) such as another processor on the same die. These advantages allow more flexible debug, monitoring, and control systems to assist system developments on a device.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. It is therefore intended that the invention be interpreted to include all variations and equivalents that fall within the true spirit and scope of the present invention.

What is claimed is:

1. A method for implementing a programmable chip, comprising:
   providing a processor core for implementation on the programmable chip, the processor core having a debug port;
   selecting a debug core associated with the processor core, the debug core operable to allow control and monitoring of the processor core;
   connecting the debug core to the debug port associated with the processor core;
   implementing the debug core and the processor core on the programmable chip,
   wherein the debug core is associated with a debug core interface allowing access to a plurality of debug core submodules; and wherein the plurality of debug core submodules are selected from a library of debug core submodules comprising a control submodule and a trigger submodule.

2. The method of claim 1, wherein the debug core comprises an Intellectual Property (IP) block.

3. The method of claim 1, wherein the plurality of debug core submodules includes a monitor memory.

4. The method of claim 3, wherein the monitor memory stores instructions and data associated with the processor core.

5. The method of claim 1, wherein the control submodule is configured to break, single-step, and reset the processor core.

6. The method of claim 1, wherein the plurality of debug core submodules includes a performance counter submodule.

7. The method of claim 6, wherein the performance counter submodule measures the performance of processor core events.

8. The method of claim 1, wherein the plurality of debug core submodules includes a trace compression submodule.

9. The method of claim 8, wherein the trace compression submodule creates a stream of compressed trace information.

10. The method of claim 1, wherein the plurality of debug core submodules includes an off-chip trace submodule.

11. The method of claim 10, wherein the off-chip trace submodule sends compressed trace information to an external trace storage device.

12. The method of claim 1, wherein the debug core is coupled to the processor core using multiple master component interconnection fabric.

13. The method of claim 1, wherein the debug core is accessed using a Joint Test Action Group (JTAG) interface.

14. A programmable chip, comprising:
   a processor core including a debug interface; and
   a debug core having a plurality of debug core submodules, the debug core coupled to the processor core and configured to control and monitor the processor core through the debug interface, the debug core associated with a debug core interface allowing access to the plurality of debug core submodules; and wherein the plurality of debug core submodules are selected from a library of debug core submodules comprising a control submodule and a trigger submodule.

15. The programmable chip of claim 14, wherein the debug core comprises an Intellectual Property (IP) block.

16. The programmable chip of claim 14, wherein the plurality of debug core submodules includes a monitor memory, wherein the monitor memory stores instructions and data associated with the processor core.

17. The programmable chip of claim 14, wherein the plurality of debug core submodules includes a control submodule, wherein the control submodule is configured to break, single-step, and reset the processor core.

18. The programmable chip of claim 14, wherein the plurality of debug core submodules includes a trigger submodule.

19. The programmable chip of claim 14, wherein the plurality of debug core submodules includes a performance counter submodule, wherein the performance counter submodule measures the performance of processor core events.

20. The programmable chip of claim 14, wherein the plurality of debug core submodules includes a trace compression submodule, wherein the trace compressions submodule creates a stream of compressed trace information.

21. The programmable chip of claim 14, wherein the plurality of debug core submodules includes an off-chip trace submodule, wherein the off-chip trace submodule sends compressed trace information to an external trace storage device.

22. The programmable chip of claim 14, wherein the debug core is coupled to the processor core using multiple master component interconnection fabric.

23. The programmable chip of claim 14, wherein the debug core is accessed using a Joint Test Action Group (JTAG) interface.

24. A computer readable medium comprising computer code embodied therein, the computer code for implementing a programmable chip, the computer readable medium comprising:

computer code for selecting a debug core associated with a processor core for implementation on the programmable chip, the processor core having a debug port, the debug core operable to allow control and monitoring of the processor core, said debug core comprising a plurality of debug core submodules;

computer code for connecting between the debug core and the debug port associated with the processor core; and computer code for implementing the debug core and the processor core on the programmable chip;

wherein the plurality of debug core submodules are selected from a library of debug core submodules comprising a control submodule and a trigger submodule.

25. A method comprising:

selecting a processor core for implementation on a programmable chip, the processor core including a debug port;

selecting a debug core and one or more debug core submodules from a library, the debug core associated with the processor core and operable to control and monitor the processor core, said a library of debug core submodules comprising a control submodule and a trace compression submodule;

generating a hardware description language file, the hardware description language file describing a design including the processor core, the debug core, and interconnections; and, implementing the design on the programmable chip.

* * * * *

UNITED STATES PATENT AND TRADEMARK OFFICE
CERTIFICATE OF CORRECTION

PATENT NO. : 7,627,784 B1  Page 1 of 1
APPLICATION NO. : 11/101027
DATED : December 1, 2009
INVENTOR(S) : Allen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 763 days.

Signed and Sealed this

Twenty-first Day of December, 2010

David J. Kappos
*Director of the United States Patent and Trademark Office*